United States Patent
Fohs

(10) Patent No.: US 12,348,018 B2
(45) Date of Patent: Jul. 1, 2025

(54) ELECTRICAL BOX, ELECTRICAL BOX ASSEMBLY AND METHOD FOR PRODUCING AN ELECTRICAL BOX

(71) Applicant: F-TRONIC GMBH, Saarbruecken (DE)

(72) Inventor: Peter Fohs, Mandelbachtal (DE)

(73) Assignee: F-TRONIC GMBH, Saarbruecken (DE)

( * ) Notice: Subject to any disclaimer, the term of this patent is extended or adjusted under 35 U.S.C. 154(b) by 191 days.

(21) Appl. No.: 18/201,924

(22) Filed: May 25, 2023

(65) Prior Publication Data
US 2024/0396315 A1 Nov. 28, 2024

(51) Int. Cl.
*H02G 3/08* (2006.01)
*H02G 15/00* (2006.01)
*H02G 15/013* (2006.01)

(52) U.S. Cl.
CPC .......... *H02G 3/083* (2013.01); *H02G 15/003* (2013.01); *H02G 15/013* (2013.01)

(58) Field of Classification Search
None
See application file for complete search history.

(56) References Cited

U.S. PATENT DOCUMENTS

| | | | |
|---|---|---|---|
| 3,879,101 A * | 4/1975 | McKissic | H01H 1/58 439/535 |
| 4,062,470 A | 12/1977 | Boteler | |
| 4,277,641 A * | 7/1981 | Bauer | H02G 3/083 174/661 |
| 4,297,525 A | 10/1981 | Bowden, Jr. | |
| 4,424,406 A | 1/1984 | Slater et al. | |
| 5,084,596 A | 1/1992 | Borsh et al. | |
| 6,365,831 B1 * | 4/2002 | Rupp | H02G 3/083 439/535 |
| 7,179,994 B2 * | 2/2007 | Elberson | H02G 3/126 174/64 |
| 8,962,997 B2 * | 2/2015 | Conway | H02G 3/081 174/59 |
| 10,777,982 B2 | 9/2020 | Zant et al. | |
| 2004/0182857 A1 * | 9/2004 | Feyes | H02G 3/088 220/3.2 |
| 2005/0092506 A1 * | 5/2005 | Hull | H02G 3/085 174/50 |

(Continued)

*Primary Examiner* — Krystal Robinson
(74) *Attorney, Agent, or Firm* — McDonnell Boehnen Hulbert & Berghoff LLP

(57) ABSTRACT

The present disclosure generally relates to an electrical box, an assembly including such a box and a method for producing same. The electrical box may have a rear wall and opposing side walls made from an injection moldable thermoplastic material, wherein the side walls define a front opening opposite the rear wall. The electrical box may further have at least one cable entry port formed in one of the side walls wherein the at least one cable entry port is provided with at least one cable-clamping closure structure. Still further, the electrical box may have a slot structure comprising at least two retaining slots provided on opposed side walls each formed for receiving and retaining at least one nail guide or mounting bracket, and/or at least two support structures provided on opposed side walls at the front edge thereof wherein each support structure can have at least one round aperture for receiving a cylindrical shaft.

17 Claims, 3 Drawing Sheets

(56) References Cited

U.S. PATENT DOCUMENTS

| | | | |
|---|---|---|---|
| 2012/0305307 A1* | 12/2012 | Korcz | H02G 3/086 174/559 |
| 2016/0126716 A1* | 5/2016 | Crompton | F16L 37/0915 285/386 |
| 2016/0172832 A1 | 6/2016 | Geno | |
| 2016/0198581 A1* | 7/2016 | Caille | H02G 3/18 174/50 |
| 2019/0052069 A1 | 2/2019 | Laukhuf | |
| 2022/0115845 A1* | 4/2022 | Chang | H02B 1/305 |
| 2023/0135439 A1* | 5/2023 | Jessogne | H02G 3/32 174/50 |
| 2023/0268724 A1* | 8/2023 | Hinley | H02G 3/0616 174/50 |

* cited by examiner

ELECTRICAL BOX, ELECTRICAL BOX ASSEMBLY AND METHOD FOR PRODUCING AN ELECTRICAL BOX

TECHNICAL FIELD

The present disclosure generally relates to an electrical box, an assembly comprising such a box and a method for producing same. Electrical boxes are typically made of an electrically insulating plastic material and may have a substantially cuboid shape with four opposing side walls and a rear wall such that a front side opposite the rear wall remains open for receiving electrical components.

BACKGROUND

Electrical outlet or junction boxes are used in building construction to house electrical components such as wires, switch assemblies, circuit breakers, and fuses or the like. The electrical box is typically secured to studs or joists in a wall, ceiling, or floor construction with the open front or face of the electrical box facing toward an interior of a room. Installation of an electrical box into an existing wall structure with joists, studs, and layers of drywall often requires portions of the wall construction including the drywall to be penetrated and removed to form an opening having a shape and size corresponding to a shape and size of a periphery of the electrical box. Subsequently, these electrical boxes secured to a suitable wall-support structure such as sheet metal or wooden studs which support a wallboard by nails or screws inserted through nail guide structures formed on the box.

Mounting assemblies for such an electrical box may include support structures to be attached to the box as disclosed in U.S. Pat. No. 4,062,470 or US 2012/0305307 A1. Other known solutions for attaching a box to a wall support structure may include outwardly extending mounting flanges or nail guides integrally formed with the electrical box as disclosed e.g. in U.S. Pat. No. 7,179,994 B2, US 2004/0182857 A1 or US 2005/0092506 A1 or a mounting plate guided in an inwardly directed slot of the box as described in U.S. Pat. No. 5,084,596 or US 2016/0172832 A1. However, these known solutions are only useful for specific applications such that different types of boxes have to be used for mounting boxes in different places of a building.

Further, known electrical boxes often have self-clamping structures for cable entry ports preventing that a cable is withdrawn or removed from the box. Examples of such self-clamping structures are disclosed in U.S. Pat. No. 4,297,525 or U.S. Pat. No. 4,424,406. These known cable entry ports have a relatively large opening connecting the interior of the box with external surroundings. In the case of a fire, such openings allow smoke to enter into rooms via the electrical boxes. For this reason, such conventional plastic electrical boxes have shortcomings relative to meeting fire rating certifications. U.S. Pat. No. 10,777,982 B2 proposes the use of an intumescent material to increase fire resistance rating of an electrical box. However, as intumescent material does not prevent entry of cold smoke, there remains a need for further contributions in this area of technology. Further, US 2019/0052069 A1 proposes a seal around an external surface of a side wall of an electrical box in order to provide a vapor barrier about a perimeter of the mounted box.

SUMMARY

According to an exemplary embodiment of the present application, an electrical box is provided which is suitable for a wide range of different applications and which is designed to increase a fire resistance rating. Other embodiments include an assembly comprising such a box and a method for producing same.

For example, an electrical box may comprise a rear wall and opposing side walls made from a first injection moldable thermoplastic material, wherein the side walls define a front opening opposite the rear wall. The box may further comprise at least one cable entry port formed in one of the side walls provided with at least one cable-clamping closure structure and/or at least one cable channel entry port formed in one of the side walls. Still further, the electrical box may be provided with a slot structure comprising at least two retaining slots located on opposed side walls and formed for receiving and retaining at least one mounting bracket or a nail guide. In addition, the electrical box may comprise at least two support structures provided on opposed side walls at the front edge thereof wherein each support structure comprises at least one round aperture for receiving a cylindrical shaft, e.g. a nail guide, and/or at least one snap lock socket for receiving and retaining at least one support flange. The combination of slot structures allowing mounting of different types of mounting brackets or nail guides and support structures allowing mounting of support flanges has the benefit that a standard box may be used for a variety of different applications by either using the box alone or by adding mounting brackets, nail guides and/or support flanges as required.

In order to increase impermeability against smoke each cable entry port and each cable channel entry port may be provided with a sealing structure made from a second injection moldable thermoplastic material different from said first injection moldable thermoplastic material. The second injection moldable thermoplastic material may be a pierceable material which closes off the aperture of the respective port while a cable or a cable channel may be pushed through the second injection moldable thermoplastic material such that the second injection moldable thermoplastic material sealingly encloses the cable or cable channel.

DETAILED DESCRIPTION

Figure 1:
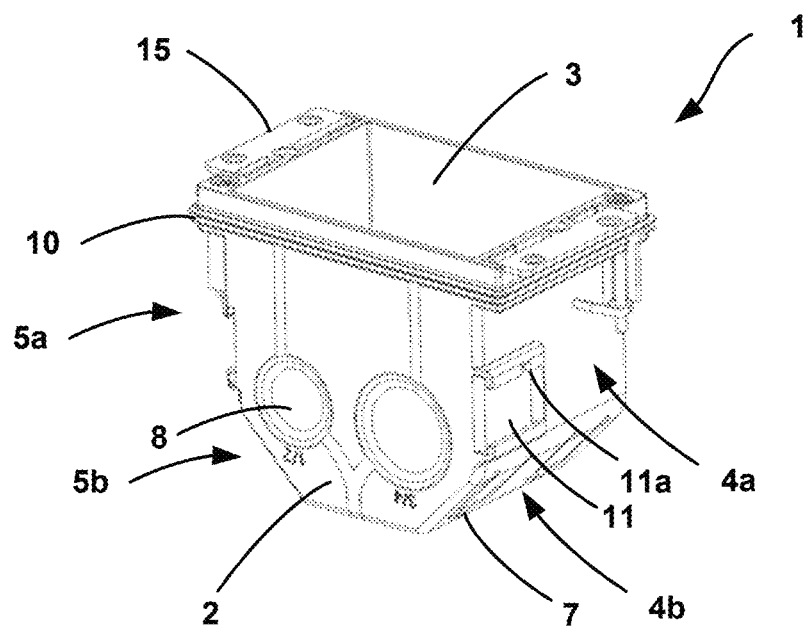
FIG. 1 is a perspective view of an electrical box according to an embodiment of the present disclosure with two attached support flanges.
Figure 2:
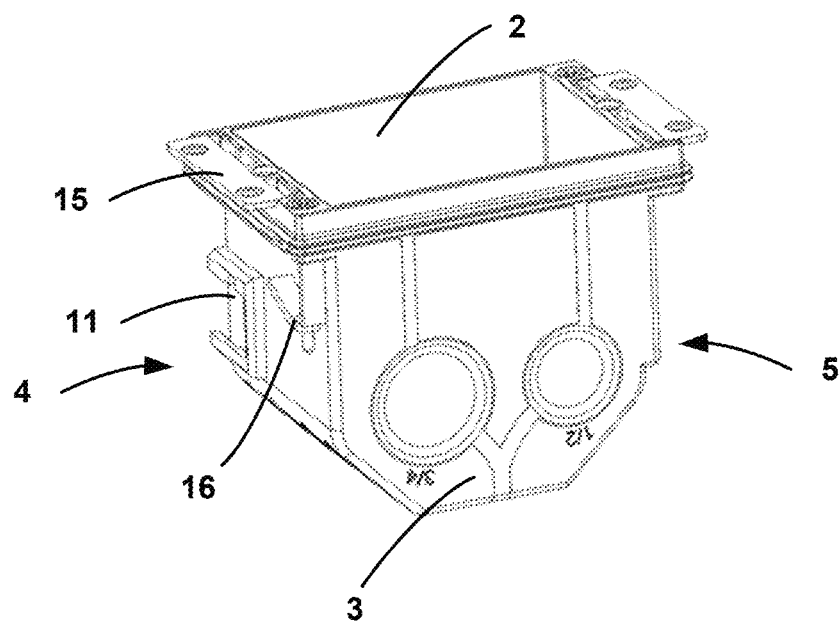
FIG. 2 is another perspective view of the electrical box of FIG. 1.
Figure 3:
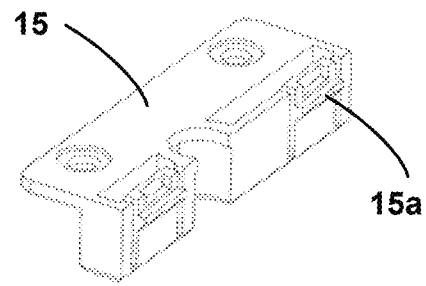
FIG. 3 is a perspective view of the support flange of FIG. 1.
Figure 4:
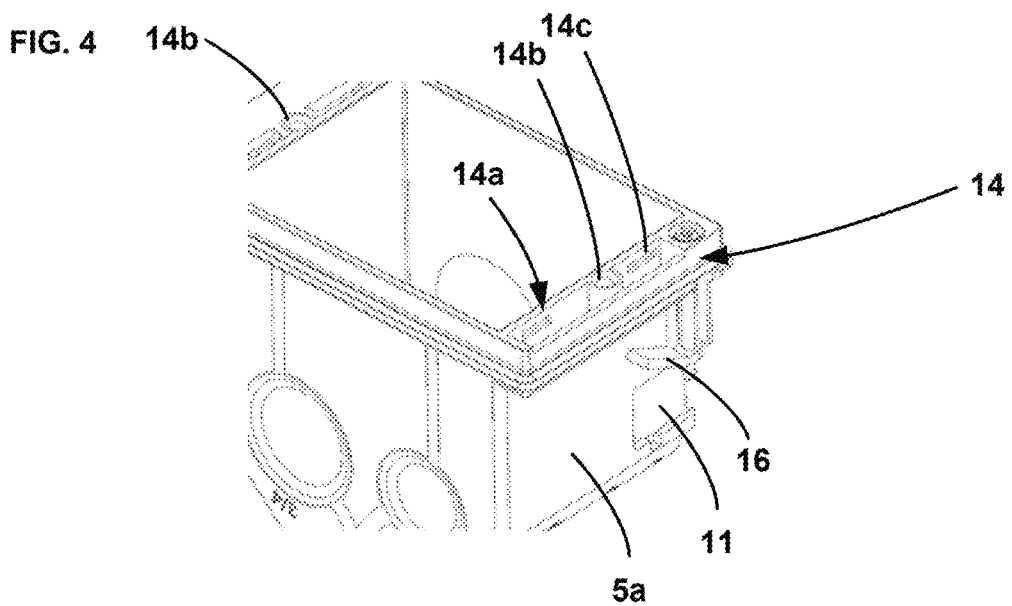
FIG. 4 is a partial perspective view of the electrical box of FIG. 1 without support flanges.

An exemplary embodiment of an electrical box 1 for receiving and housing electrical components such as wires, switch assemblies, circuit breakers, and fuses or the like (not shown) and accessory parts for mounting the electrical box 1 to the wall structure (not shown) are depicted in the Figures.

In the depicted electrical box 1 has a substantially cuboid shape with four opposing side walls 2, 3, 4, 5 and a rear wall 6 such that a front side (upper side in FIG. 1) opposite the rear wall 6 remains open for receiving electrical components. The side walls 2, 3, 4, 5 and the rear wall 6 are made from a first injection moldable thermoplastic material which is sufficiently stiff at room temperature. Suitable materials include but are not limited to) PE and PP. Side walls 2 and 3 substantially extend in parallel flat planes, whereas side walls 4 and 5 each comprise a front portion 4a, 5a extending in parallel planes and a rear portion 4b, 5b extending in inclined planes. In other words, side walls 4, 5 are designed such that the electrical box 1 tapers towards rear wall 6 in the depicted exemplary embodiment.

The electrical box 1 comprises cable entry ports 7 formed in side walls. More specifically, to cable entry ports 7 are formed in each side wall rear portion 4b and 5b, respectively. The present disclosure is not limited to the depicted number and location of the cable entry ports 7. Rather, the specific number and location of the cable entry ports 7 for an the electrical box 1 may be chosen as required. A cable entry port 7 is generally an, preferably initially closed, aperture permitting insertion of one or more cables into the electrical box 1. An initially closed cable entry port 7 may be formed by providing a sealing structure and/or a breakable and/or weakened line in a wall of the electrical box 1 which may be severed or removed if it is intended to insert a cable at the respective position of the cable entry port 7.

Figure 7:
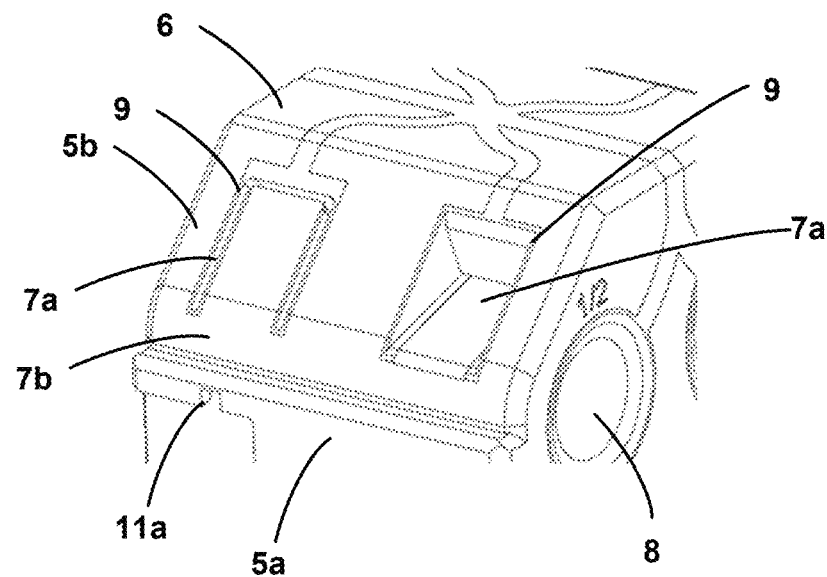
FIG. 7 is a partial perspective view of the electrical box of FIG. 1 with a deflected flap.
Figure 8:
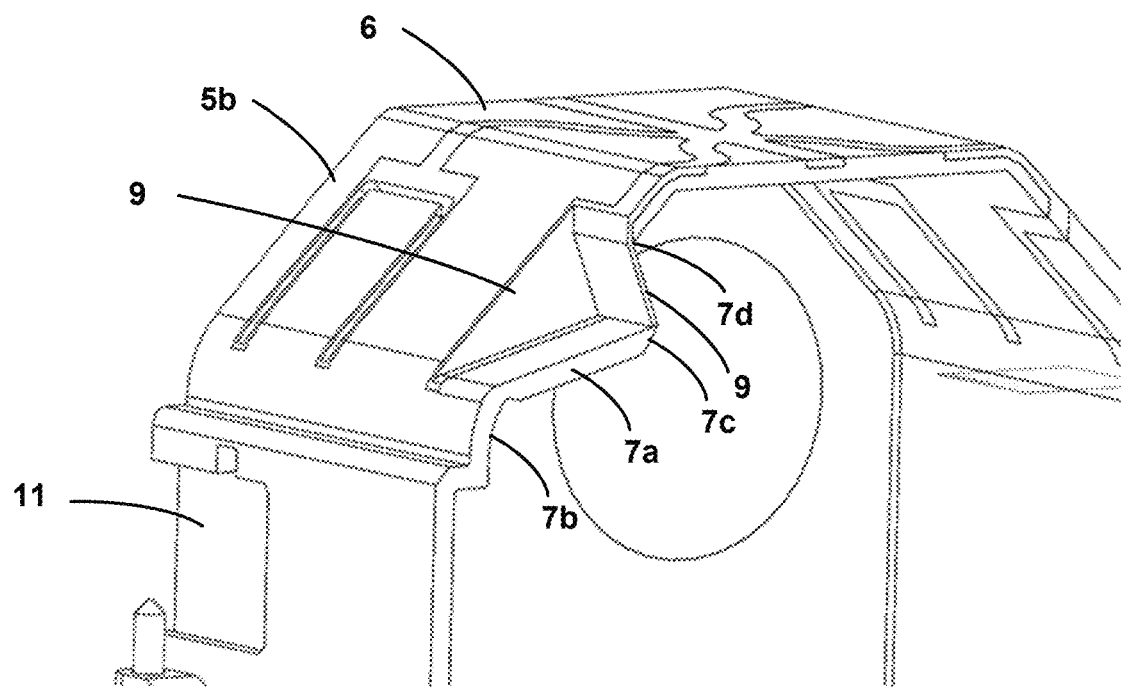
FIG. 8 is a partial sectional view of the electrical box of FIG. 1 with a deflected flap.

In order to prevent that a cable is inadvertently withdrawn or removed from the electrical box 1, a cable-clamping closure structure may be provided or may be part of a cable entry port 7. FIGS. 7 and 8 depict such a cable-clamping closure structure in more detail. The cable-clamping closure structure comprises a flap 7a connected to the respective side wall rear portion 4b and 5b by a hinge 7b. A rectangular gap in the first injection moldable thermoplastic material may define the further boundaries of the flap 7a. A sharp edge 7c is provided at the end of the flap 7a opposite to the hinge 7b. A further sharp edge 7d may be provided at a side of the respective side wall rear portion 4b and 5b facing towards the flap 7a. A cable (not shown) may be pushed into the cable entry port 7, thereby deflecting flap 7a. If tensile stress is applied to the cable, sharp edges 7c, 7d bite into the cable, thereby preventing that the cable is inadvertently withdrawn or removed from the electrical box 1.

In addition or as an alternative, at least one cable channel entry port 8 is formed in one of the side walls. A cable channel entry port 8 may be a circular or rectangular aperture in one of the side walls which may be initially closed. An initially closed cable channel entry port 8 may be formed by providing a sealing structure and/or a breakable and/or weakened line in a wall of the electrical box 1 which may be severed or removed if it is intended to insert a cable channel at the respective position of the cable channel entry port 8. In the specific exemplary embodiment depicted in the Figures, two circular cable channel entry ports 8 are provided in each of the side walls 2 and 3, respectively.

The electrical box 1 depicted in the Figures is provided with a sealing structure 9 made from a second injection moldable thermoplastic material different from said first injection moldable thermoplastic material. The second injection moldable thermoplastic material may be rubber elastic such that the stiffness of the first injection moldable thermoplastic material is higher than the stiffness of the second injection moldable thermoplastic material. The sealing structure 9 is provided in the gaps surrounding flaps 7a of cable entry ports 7 and covers the cable channel entry ports 8. In an exemplary embodiment of the sealing structure 9 the gaps surrounding flaps 7a of cable entry ports 7 are covered with a bellows or a bulge of said second injection moldable thermoplastic material.

The sealing structure 9 may be provided as a single integral sealing structure covering the gaps of all flaps 7a and all cable channel entry ports 8 or may be provides in several portions. In addition, at least one sealing lip 10 of said second injection moldable thermoplastic material may be provided near the front end of each side wall 2, 3, 4, 5. In the specific exemplary embodiment depicted in the Figures, two lips 10 are provided integrally formed with the sealing structure for the cable entry ports 7 and the cable channel entry ports 8.

In order to mount the electrical box 1 into an existing wall structure (not shown) or to studs or joists of a wall structure, it may be required to insert the electrical box 1 into an opening formed by removing portions of the wall construction. In such cases, it would be detrimental if the electrical box 1 would be provided with laterally protruding flanges or the like. On the other hand, flanges, mounting brackets, nail guides or the like may be required for other applications or after the electrical box 1 is inserted into a wall structure.

In an exemplary embodiment, a slot structure comprising at least two retaining slots 11 may be provided on opposed side walls 4, 5 each formed for receiving and retaining at least one nail guide 12 and/or mounting bracket 13. The retaining slot(s) 11 may be formed on the outer side of a side wall 4, 5 such that a guiding channel is formed extending substantially parallel to the respective side wall 4, 5 in a direction perpendicular to the front to rear direction. In other words, a nail guide 12 and/or a mounting bracket 13 may be inserted into the guiding channel formed by the respective retaining slot 11 in a direction from the front side of FIG. 1.

Figure 5:
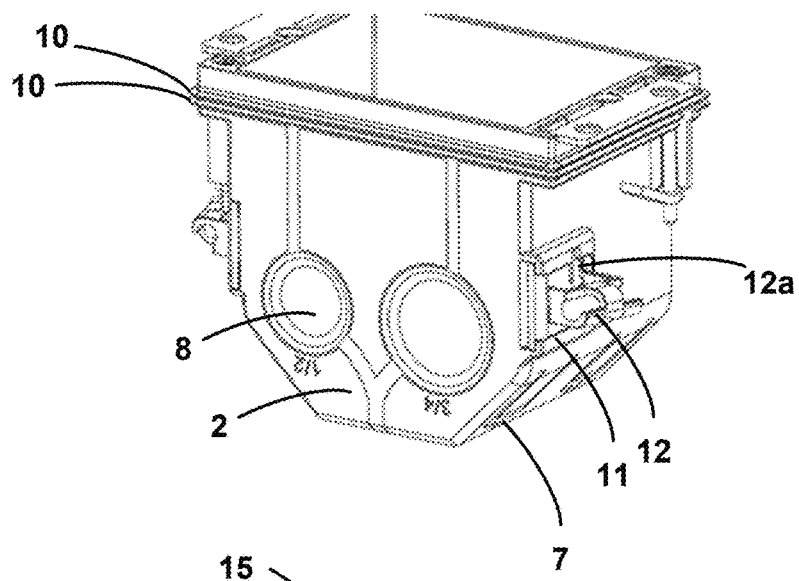
FIG. 5 is a partial perspective view of the electrical box of FIG. 1 with attached nail guides.
Figure 6:
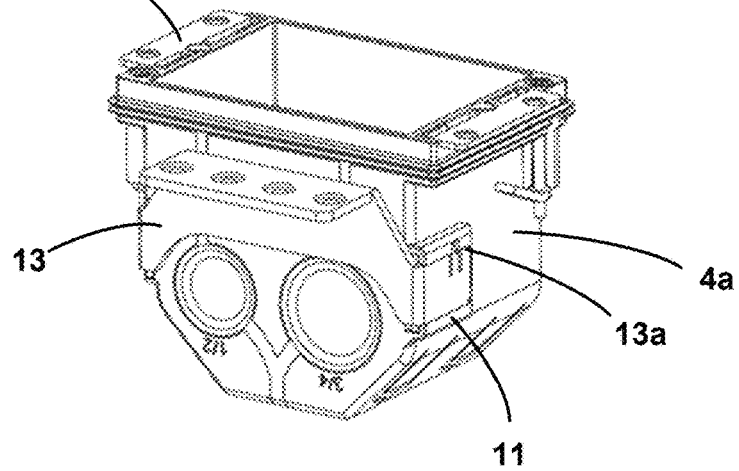
FIG. 6 is a perspective view of the electrical box of FIG. 1 with attached mounting bracket.

FIG. 5 shows two nail guides 12 received in the retaining slots 11. FIG. 6 shows one mounting bracket 13 received in the retaining slots 11, i.e. the mounting bracket 13 spans over the side wall 2. In the exemplary embodiment depicted in FIG. 6, the mounting bracket 13 has a bridge-like shape such that the cable channel entry ports 8 are not covered by the mounting bracket 13 and remain accessible for inserting cable channels if required.

The retaining slots 11 are provided with at least one snap recess 11a and the nail guides 12 and/or the mounting bracket 13 are provided with deflectable fingers 12a, 13a forming a snap protrusion which may snap in a respective snap recess 11a to fix the nail guides 12 and/or the mounting bracket 13 in the retaining slots 11. As an alternative, the retaining slots 11 may be provided with at least one deflectable finger and the nail guides 12 and/or the mounting bracket 13 may be provided with snap recesses.

In an exemplary embodiment, at least two support structures 14 may be provided on opposed side walls 4, 5 at the front edge thereof (upper edge in FIG. 1). For example, each support structure 14 comprises at least one snap lock socket 14a for receiving and retaining at least one support flange 15 and/or at least one round aperture 14b for receiving a cylindrical shaft of a nail or screw or the like. In the exemplary embodiment depicted in the Figures, each of the two support structures 14 is provided as an external lateral protrusion on the respective side wall 4, 5, wherein the snap lock sockets 14a comprise a snap recess 14c which may engage with a snap finger 15a of the support flange 15. Thus, the support flange 15 which may protrude laterally from electrical box 1 may be mounted individually and e.g. after inserting the box into a wall structure. In this respect, the at least one snap lock socket 14*a* may define an aperture extending in the front to rear direction, i.e. from the upper side in FIG. 1 towards the lower side. Such a support flange 15 may interact with a rotatable counter-holder 16 received in one of the apertures 14*b* in order to clamp a portion of a wall structure between the support flange 15 and the counter-holder 16 to secure the electrical box 1 to the wall structure.

For use with electrical installations, it may be preferable if the electrical box 1 is provided without any of the above mentioned accessories, like nail guides 12, mounting brackets 13, support flanges 15 or even without counter-holder 16 attached. These accessories may be provided separately and may be attached to the electrical box 1 as required. In other words, an electrical box assembly may be provided comprising the electrical box 1 and at least one accessory part selected from the group comprising e.g. a nail guide 12, a mounting bracket 13, a support flange 15 and a counter-holder 16. Further accessory parts may include a claw and/or a lid.

A highly efficient method of producing an electrical box 1, comprises the steps of first injection molding the rear wall 6 and the opposing side walls 2, 3, 4, 5 including at least one cable-clamping closure structure 7*a*, at least two retaining slots 11 and at least two support structures 14, from the first injection moldable thermoplastic material and thereafter injection molding at least one sealing structure 9 and/or a lip 10 from the rubber elastic second injection moldable thermoplastic material.

If it is intended to form the sealing structure 9 in the area of the gaps surrounding flaps 7*a* of cable entry ports 7 as a bellows or a bulge of said second injection moldable thermoplastic material, the flap 7*a* of the cable-clamping closure structure may be deflected (from the position shown for the left flap in FIGS. 7 and 8) to be inclined relative to the side wall 4, 5 to which the flap 7*a* is hinged (into the position shown for the right flap in FIGS. 7 and 8) after the first injection molding step such that during the step of applying the second injection moldable thermoplastic material flap 7*a* is deflected. After applying the second injection moldable thermoplastic material, flap 7*a* elastically returns to its unstressed initial position (the position shown for the left flap in FIGS. 7 and 8), thereby forming a bellows or a bulge of said second injection moldable thermoplastic material in the area of the gaps surrounding the flaps 7*a*.

If the sealing structure 9 has the form of a bellows or a bulge in the area of the gaps surrounding flaps 7*a* of cable entry ports 7, a cable may be inserted into the cable entry port 7 thereby deflecting flap 7*a* without fully destroying the sealing structure 9. Rather, the sealing structure 9 is only pierced by the inserted cable and remains in tight fit surrounding the cable. This maintains a good sealing function.

In an exemplary embodiment of the present disclosure, an electrical box 1 comprises the rear wall 6 and the opposing side walls 2, 3, 4, 5 made from an injection moldable thermoplastic material, arranged and configured such that the side walls 2, 3, 4, 5 define a front opening opposite the rear wall 6. The electrical box 1 further comprises at least one cable entry port 7 formed in one of the side walls 2, 3, 4, 5. The at least one cable entry port 7 is provided with at least one cable-clamping closure structure 7*a*. Still further, the electrical box 1 may comprises a slot structure with at least two retaining slots 11 provided on opposed side walls 4, 5 each configured for receiving and retaining at least one nail guide 12, at least one mounting bracket 13 or the like. At least two support structures 14 are provided on opposed side walls 4, 5 at the front edge thereof wherein each support structure 14 comprises at least one snap lock socket 14*a* configured for receiving and retaining at least one support flange 15. In this exemplary embodiment of the present disclosure, the electrical box 1 may be one single piece made from the same thermoplastic material by injection molding. Optionally, the electrical box 1 may comprise further features, like a cable channel entry port 8 and/or a sealing structure.

The invention claimed is:

1. An electrical box comprising:
   a rear wall and opposing side walls made from a first injection moldable thermoplastic material, wherein the side walls define a front opening opposite the rear wall,
   at least one cable entry port formed in one of the side walls wherein the at least one cable entry port is provided with at least one cable-clamping closure structure,
   at least one cable channel entry port formed in one of the side walls wherein the at least one cable channel entry port is provided with a sealing structure,
   a slot structure comprising at least two retaining slots provided on opposed side walls each formed for receiving and retaining at least one nail guide or mounting bracket,
   at least two support structures provided on opposed side walls at the front edge thereof wherein each support structure comprises at least one round aperture for receiving a cylindrical shaft and at least one snap lock socket for receiving and retaining at least one support flange.

2. The electrical box according to claim 1, wherein the at least one cable entry port further comprises a sealing structure made from a second injection moldable thermoplastic material different from said first injection moldable thermoplastic material, and wherein the sealing structure of the at least one cable channel entry port is made from said second injection moldable thermoplastic material.

3. The electrical box according to claim 2, wherein the second injection moldable thermoplastic material is rubber elastic and wherein the stiffness of the first injection moldable thermoplastic material is higher than the stiffness of the second injection moldable thermoplastic material.

4. The electrical box according to claim 2, wherein the at least one cable-clamping closure structure of the cable entry port comprises a flap pivotably hinged to one of said side walls and partially separated from said side wall by a gap.

5. The electrical box according to claim 4, wherein said gap is covered with a film of said second injection moldable thermoplastic material.

6. The electrical box according to claim 4, wherein said gap is covered with a bellows or a bulge of said second injection moldable thermoplastic material.

7. The electrical box according to claim 2, wherein the at least one cable channel entry port comprises a round aperture covered with a film of said second injection moldable thermoplastic material.

8. The electrical box according to claim 2, further comprising at least one sealing lip of said second injection moldable thermoplastic material provided near the front end of each side wall.

9. The electrical box according to claim 1, wherein two opposite side walls extend in parallel flat planes and wherein two further opposite side walls comprise a front portion extending in parallel planes and a rear portion extending in inclined planes.

10. The electrical box according to claim 9, wherein the at least one cable entry port is formed in said rear portion of one of the further side walls.

11. The electrical box according to claim 1, wherein each retaining slot is formed on the outer side of a side wall forming a guiding channel extending substantially parallel to the respective side wall in a direction perpendicular to the front to rear direction and wherein each retaining slot comprises a snap recess or a snap protrusion.

12. The electrical box according to claim 1, wherein each of the at least two support structures is provided as an external lateral protrusion on a respective side wall, wherein the at least one snap lock socket comprises a snap recess or a snap protrusion.

13. The electrical box according to claim 12, wherein the at least one snap lock socket defines an aperture extending in the front to rear direction.

14. An electrical box assembly comprising:
the electrical box according to claim 1 and at least one accessory part selected from the group comprising: a single nail mounting bracket, a flange type mounting bracket, a support flange, a counter-holder, a claw and/or a lid.

15. A method of producing an electrical box according to claim 1, the method comprising the steps of:

(i) injection molding a rear wall and opposing side walls including at least one cable-clamping closure structure, at least two retaining slots and at least two support structures each comprising at least one round aperture for receiving a cylindrical shaft and at least one snap lock socket from a first injection moldable thermoplastic material, and thereafter (ii) injection molding at least one cable entry port sealing structure, at least one cable channel entry port sealing structure and at least one sealing lip from a rubber elastic second injection moldable thermoplastic material wherein the stiffness of the first injection moldable thermoplastic material is higher than the stiffness of the second injection moldable thermoplastic material.

16. The method of claim 15, wherein, a flap of the at least one cable-clamping closure structure is deflected to be inclined relative to the side wall to which the flap is hinged during step (ii).

17. The electrical box according to claim 1, wherein the at least one cable-clamping closure structure of the cable entry port comprises a flap pivotably hinged to one of said side walls and partially separated from said side wall by a gap.

* * * * *